US010680743B2

(12) United States Patent
Madan et al.

(10) Patent No.: US 10,680,743 B2
(45) Date of Patent: *Jun. 9, 2020

(54) LINK ADAPTATION BASED ON NEIGHBORING CELL TRANSMISSION INFORMATION

(71) Applicant: CISCO TECHNOLOGY, INC., San Jose, CA (US)

(72) Inventors: Ritesh Kumar Madan, Berkeley, CA (US); Rohit Umesh Nabar, Sunnyvale, CA (US); Vikram Chandrasekhar, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/429,016

(22) Filed: Feb. 9, 2017

(65) Prior Publication Data

US 2017/0155471 A1     Jun. 1, 2017

Related U.S. Application Data

(63) Continuation of application No. 14/557,722, filed on Dec. 2, 2014, now Pat. No. 9,571,228.

(51) Int. Cl.
*H04L 1/00* (2006.01)
*H04B 17/336* (2015.01)
*H04W 52/14* (2009.01)

(52) U.S. Cl.
CPC ......... *H04L 1/0015* (2013.01); *H04B 17/336* (2015.01); *H04L 1/0026* (2013.01); *H04W 52/143* (2013.01)

(58) Field of Classification Search
CPC ... H04L 1/0015; H04L 1/0001; H04L 1/0026; H04L 1/0023
USPC ................................ 370/328, 394, 252, 280
See application file for complete search history.

(56) References Cited

U.S. PATENT DOCUMENTS

| | | | |
|---|---|---|---|
| 9,571,228 B2 | 2/2017 | Madan et al. | |
| 2007/0097981 A1* | 5/2007 | Papasakellariou | H04L 1/1854 370/394 |
| 2013/0153298 A1* | 6/2013 | Pietraski | E21B 7/04 175/45 |
| 2013/0242933 A1* | 9/2013 | Fujimoto | H04W 72/085 370/329 |
| 2013/0303153 A1* | 11/2013 | Bontu | H04L 1/0026 455/423 |
| 2013/0336269 A1 | 12/2013 | Davydov | |
| 2014/0133437 A1 | 5/2014 | Papasakellarious | |

(Continued)

*Primary Examiner* — Kwang B Yao
*Assistant Examiner* — Syed M Bokhari
(74) *Attorney, Agent, or Firm* — Patterson + Sheridan, LLP (57) ABSTRACT

The present disclosure provides a fine-grained link adaptation mechanism that allows for link adaptation at a resource block granularity. To this end, the fine-grained link adaptation mechanism can determine the effective signal-to-interference-plus-noise ratio for individual user equipment in a particular cell at the resource block granularity. This way, the transmitter can use the effective signal-to-interference-plus-noise ratio to adapt the modulation and coding scheme at the resource block granularity. The fine-grained link adaptation mechanism can be introduced to a long term evolution (LTE) network without substantial redesign of the LTE network.

20 Claims, 4 Drawing Sheets

(56) References Cited

U.S. PATENT DOCUMENTS

| | | | |
|---|---|---|---|
| 2014/0146700 A1* | 5/2014 | Fonseca Dos Santos | H04W 16/14 370/252 |
| 2014/0341093 A1* | 11/2014 | Seo | H04W 52/143 370/280 |
| 2015/0071176 A1* | 3/2015 | Boudreau | H04W 72/0406 370/328 |
| 2016/0037550 A1* | 2/2016 | Barabell | H04B 17/318 455/450 |
| 2017/0034795 A1 | 2/2017 | Madan et al. | |
| 2017/0041939 A1 | 2/2017 | Madan et al. | |

* cited by examiner

LINK ADAPTATION BASED ON NEIGHBORING CELL TRANSMISSION INFORMATION

RELATED APPLICATION

This Application is a continuation application (and claims the benefit of priority under 35 U.S.C. § 120) of U.S. application Ser. No. 14/557,722 entitled "LINK ADAPTATION BASED ON NEIGHBORING CELL TRANSMISSION INFORMATION," filed on Dec. 2, 2014, Inventors Ritesh Kumar Madan, et al. The disclosure of this prior application is considered part of the disclosure of this application and is incorporated by reference.

FIELD OF THE DISCLOSURE

This disclosure relates generally to apparatus, systems, and methods for providing a fine-grained link adaptation mechanism.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology. Such devices can use connections to the wireless networks to download video data.

DESCRIPTION OF EXAMPLE EMBODIMENTS

Overview

Some embodiments include a method for communicating with a receiver using a modulation and coding scheme (MCS). The method includes determining, at a transmitter in communication with the receiver in a communications network, an interference adjustment factor that accounts for a signal interference level for a particular resource block; determining the MCS for the receiver for the particular resource block based, at least in part, on the interference adjustment factor; and communicating with the receiver using the determined MCS.

Some embodiments include a network device. The network device includes one or more interfaces configured to provide wireless communication with a receiver; and a processor, in communication with the one or more interfaces, and configured to run a module stored in memory. The network device is configured to determine an interference adjustment factor that accounts for a signal interference level unique for a particular resource block; determine a modulation and coding scheme (MCS) for the receiver for the particular resource block based, at least in part, on the interference adjustment factor; and communicate with the receiver using the determined MCS.

Some embodiments include a method for determining a modulation and coding scheme (MCS) for a receiver. The method includes determining, at a transmitter in communication with the receiver, a signal-to-interference-plus-noise ratio (SINR) based on channel state information received from the receiver; determining an adaptation factor based on a predetermined limit of a number of packet retransmissions to the receiver; determining an interference adjustment factor that accounts for a signal interference level at a resource block granularity; and determining the MCS for the receiver at the resource block granularity based, at least in part, on the SINR, the adaptation factor, and the interference adjustment factor.

Example Embodiments

Link adaptation relates to an ability to adapt the modulation, coding and other signal and protocol parameters to the conditions of the radio link. For example, when the radio link condition is good, a transmitter can transmit data using a small amount of error correction, which allows for a high data transmission rate. On the other hand, when the radio link condition is poor, a transmitter needs to transmit data using a large amount of error correction and a more robust modulation scheme, which can limit the data transmission rate.

Transmitters can adapt a modulation and coding scheme (MCS) to a radio link condition based, at least in part, on Level 1 (L1) control information of the radio link. The L1 control information can include one or more of a set of resource blocks (RBs) allotted to a receiver, transmission power (e.g., power spectral density) to the receiver, transmission history associated with the receiver (e.g., the history of MCS, RBs assigned, ACK/NACK for past transmissions to the receiver), and/or a predetermined block error rate (BLER) on a given number of hybrid automatic repeat request (H-ARQ) retransmissions to the receiver.

The L1 control information can also include channel state information. In some cases, transmitters can acquire the channel state information from the receiver, which can measure the channel state information. For example, in Long Term Evolution (LTE) networks, a transmitter can transmit a reference signal to a receiver, and the receiver can estimate a ratio of signal and noise, such as a Signal to Interference and Noise Ratio (SINR), of the channel based on the SINR of the reference signal. Subsequently, the receiver can use the estimated SINR of the channel to determine a Channel Quality Indicator (CQI), and send the CQI to back to the transmitter.

One of the factors that affects the radio link condition is interference. In an LTE network, due to the orthogonal nature of orthogonal frequency-division multiple access (OFDMA) signals, there is no interference between signals within a cell. However, as signals originating from different cells are not orthogonal in nature, a cell edge user may experience interference due to signals from adjacent cells. LTE uses a frequency reuse of one, which indicates that adjacent cells can transmit signals on the same frequency band, resulting in inter-cell interference.

To a certain degree, traditional transmitters adapt the MCS to the interference of signals from adjacent cells. For example, the CQI can account for an average interference level over a sub-band of frequencies (in case of the sub-band CQI) or over an entire cell bandwidth (in case of the wideband CQI). However, traditional transmitters do not adapt the MCS to the interference of signals from adjacent cells at a RB granularity. For example, if the signal transmission power levels in RBs are individually controlled, then the CQI would not provide an accurate representation of the SINR on a given RB and the CQI cannot provide sufficient information for a base station to adapt the signal transmission at the RB granularity.

One may attempt to capture the interference information by using reference signals having the same power (e.g., power spectral density) as the data signals and re-estimating the SINR of the channel every time the data signals change their power profile. However, this scheme cannot be implemented in the current release of LTE. Furthermore, this scheme requires the following steps every time the inter-cell interference changes: reference signal transmission by the transmitter to a receiver (e.g., user equipment (UE)), reference signal detection by the receiver, and CQI feedback by the receiver to the transmitter. Incorporating these additional steps in LTE can involve a significant re-design of the network, and can entail significant control overhead.

The disclosed embodiments provide a fine-grained link adaptation mechanism that allows for link adaptation at the RB granularity. To this end, the fine-grained link adaptation mechanism can determine the effective SINR for an individual receiver, such as UE, in a particular cell at the RB granularity, and thus the transmitter can use the effective SINR to adapt the MCS at the RB granularity. The fine-grained link adaptation mechanism can be introduced to an LTE network without substantial redesign of the LTE network.

In some embodiments, under the fine-grained link adaptation mechanism, a transmitter can determine an effective SINR for a particular receiver (e.g., UE) in a particular cell based on at least three factors: (1) a SINR derived from channel state information (e.g., CQI), (2) an adaptation factor selected based on (a) the predetermined limit on the number of packet retransmissions for successful communication and/or (b) the MCS previously assigned to the particular receiver and the particular cell, and (3) an interference adjustment factor that accounts for the inter-cell interference at the RB granularity. While traditional transmitters have used the SINR from the CQI and/or the adaptation factor for determining the effective SINR, traditional transmitters failed to use the interference adjustment factor to account for the inter-cell interference at the RB granularity.

In some embodiments, the interference adjustment factor for a particular RB can be determined based on a difference between (1) the SINR derived from channel state information, such as a CQI, for a sub-band of frequencies including the particular RB, and (2) the SINR of the downlink data channel, such as the Physical Downlink Shared Channel (PDSCH), for the particular RB. This way, the interference adjustment factor can explicitly account for the difference in SINR for each RB.

In some embodiments, the difference between (1) the SINR derived from the channel state information, and (2) the SINR of the downlink data channel can be determined based on a ratio of (a) the signal transmission power on the downlink data channel, and (b) the transmission power of the cell specific reference signal (CRS) for both the serving cell and neighboring cells. Since the transmitter is within the serving cell, the transmitter can easily obtain the signal transmission power on the downlink data channel and the transmission power of the reference signal for the serving cell. In some cases, the transmitter can obtain the signal transmission power on the downlink data channel and the transmission power of the reference signal for neighboring cells based on resource block scheduling information, which may be received by the transmitter as a part of a Relative Narrowband Transmit Power (RNTP) message.

Figure 1:
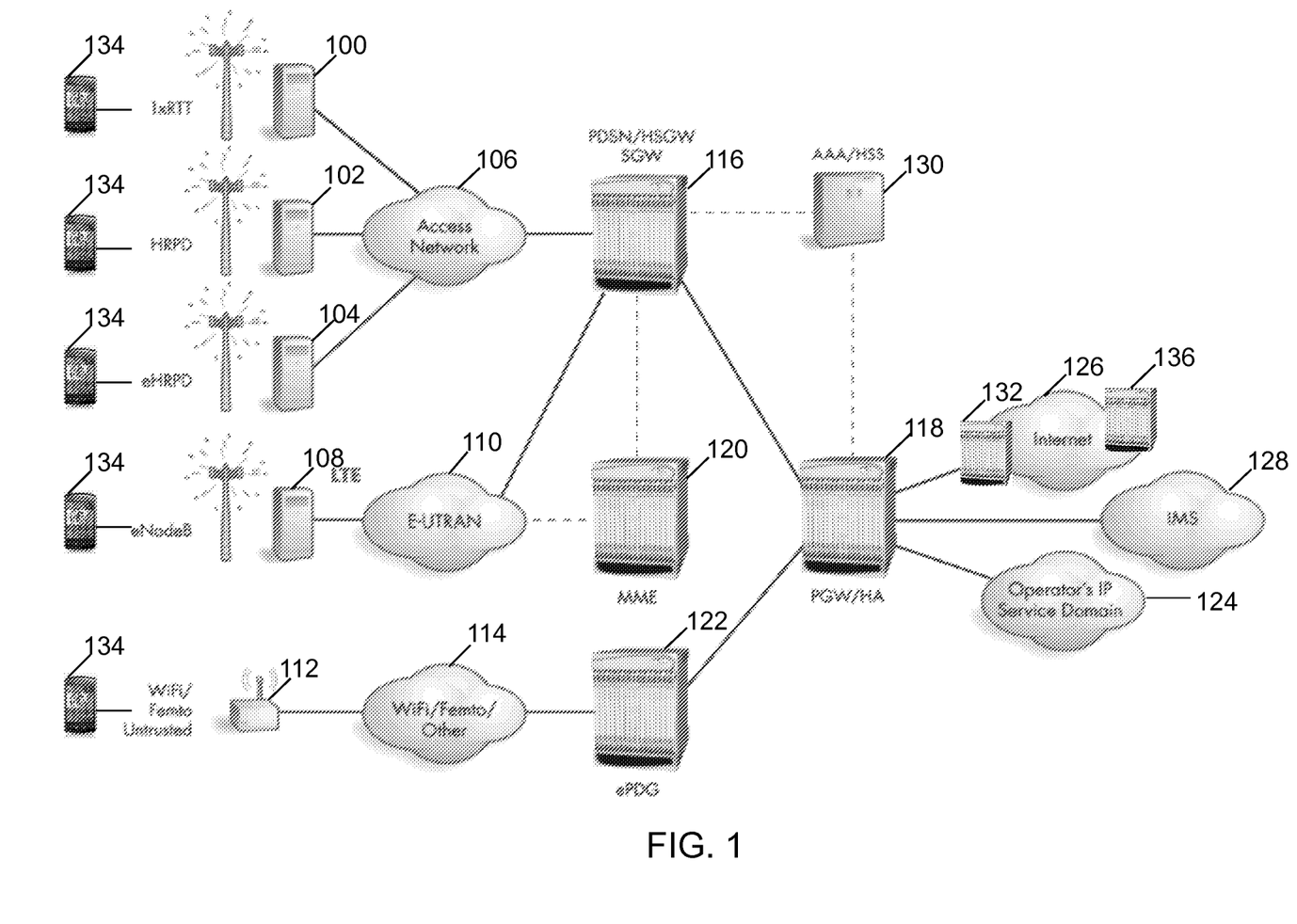
FIG. 1 illustrates a communication network that implements a fine-grained link adaptation mechanism in accordance with some embodiments.

FIG. 1 illustrates a communication network that implements a fine-grained link adaptation mechanism in accordance with some embodiments. FIG. 1 includes a number of transmitters, such as base stations, that may implement the fine-grained link adaptation mechanism. The base stations can include a 1×RTT transceiver 100, a high-rate packet data (HRPD) transceiver 102, and an evolved high-rate packet data (eHRPD) transceiver 104, each of which can connect to an access network 106. The base stations can also include an evolved Node B (eNodeB) transceiver 108, which is an LTE network radio network component that connects to an Evolved UMTS Terrestrial Radio Access Network (E-UTRAN) 110. Other base stations such as Wi-Fi, Femto, WiMAX, or any other radio spectrum technology, can use a transceiver shown generally as 112 to connect user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the Wi-Fi/Femto/other transceiver 112. On the packet core side, the anchor gateway can communicate with the operator's IP service domain 124, the internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME provides the control plane function for mobility between LTE and 2G/3G access networks with the S3 interface terminating at the MME from the SGSN (not shown). The MME terminates the S6a interface towards the home HSS for roaming UEs.

The ePDG 122 is responsible for interworking between the EPC and fixed non-3GPP access technologies such as a Wi-Fi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
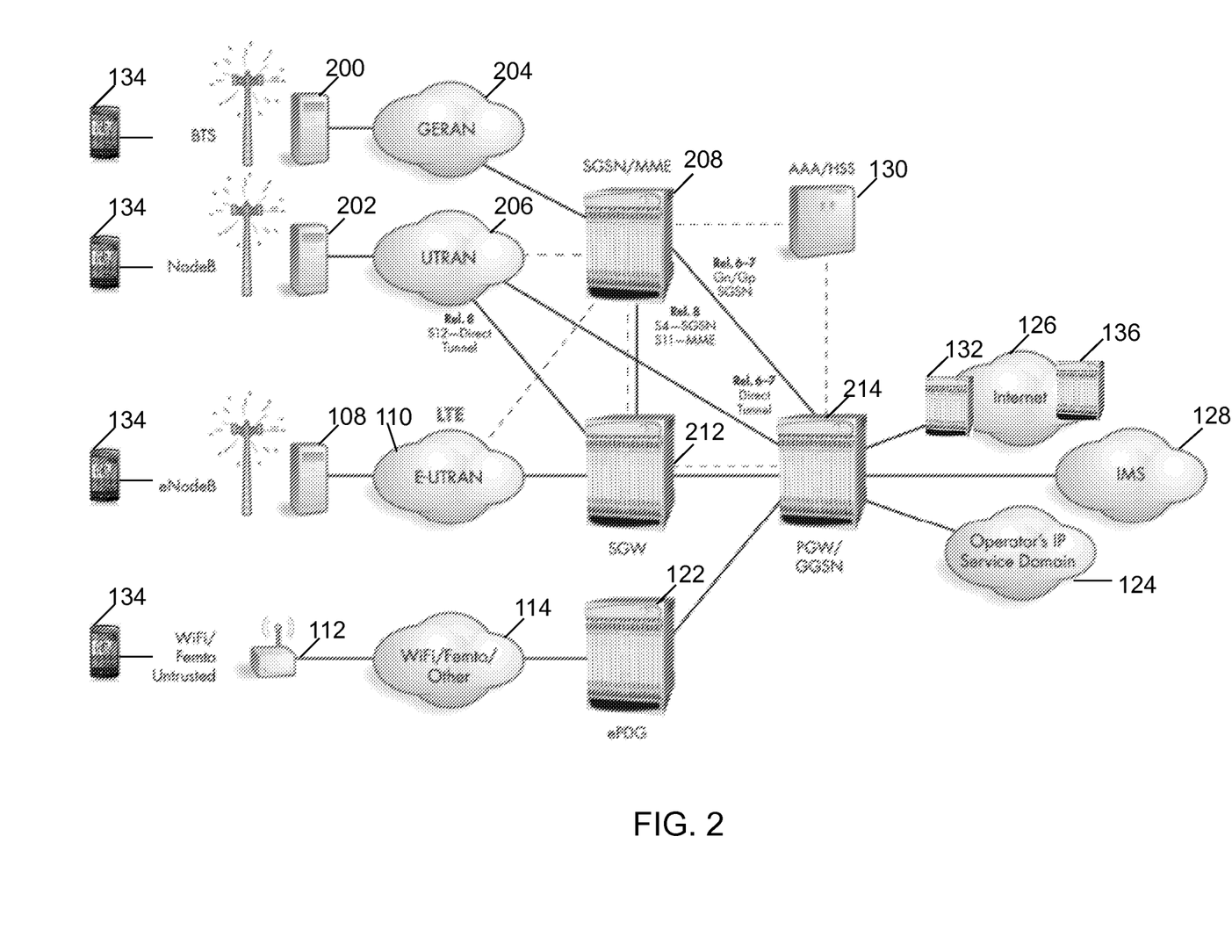
FIG. 2 illustrates a communication network that implements a fine-grained link adaptation mechanism in accordance with universal mobile telecommunications systems (UMTS) network devices in accordance with some embodiments.

FIG. 2 illustrates a communication network that implements a fine-grained link adaptation mechanism in accordance with universal mobile telecommunications systems (UMTS) network devices in accordance with some embodiments. The transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the gateways, such as PGW/HA 118, PDSN/HSGW/SGW 116, SGSN/MME 208, PGW/GGSN 214, or SGW 212 and/or data centers 132, can access and maintain information relating to the communication session, the subscriber, the radio bearers, and the policies relating to the communication session. The gateways may be used to provide various services to a UE 134 and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location-based services, and a variety of delivered to a mobile node. Residing within the gateways can be one or more network processing units, line cards, as well as packet and voice processing cards.

Figure 3:
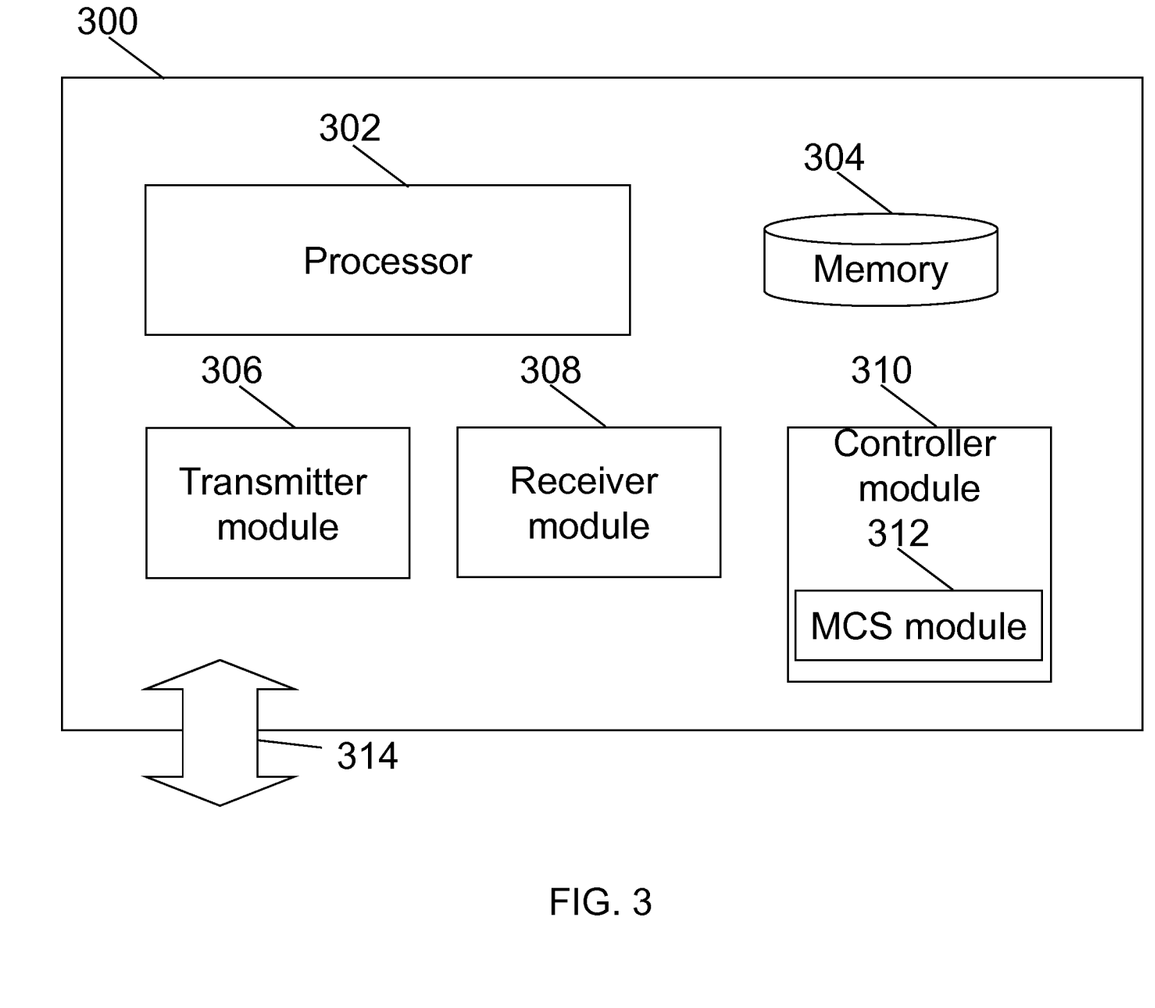
FIG. 3 illustrates a base station in accordance with some embodiments.

A base station can be configured to wirelessly communicate with the UE 134 according to any of a variety of wireless communication standards. The base station 300 can be configured to employ packet retransmission scheme such as a HARQ scheme in connection with transmissions sent to UE 134.

A base station, which may include an eNodeB transceiver 108, base transceiver station (BTS) 200, NodeB transceiver 202, Wi-Fi/Femto/small cell/untrusted/other transceiver 112, can include a plurality of antennas. The plurality of antennas can provide wireless communications with a plurality of UE 134. Each UE 134 can include at least one antenna, but in general each may include a plurality of antennas.

A base station can be configured to use a link adaptation scheme in order to control the link reliability and the packet retransmission rate for reliability and throughput enhancements. For example, the base station can receive from the UE 134 a message containing SINR information, and use the SINR information to compute a fading margin due to retransmission and an effective SINR. The base station can use the effective SINR to select a modulation and coding scheme (MCS) for downlink transmissions to the UE 134.

FIG. 3 illustrates a base station in accordance with some embodiments. The base station 300 can include a processor 302, a memory device 304, a transmitter module 306, a receiver module 308, a controller module 310, and an interface 314.

In some embodiments, the interface 314 can be implemented in hardware to send and receive signals in a variety of mediums, such as optical, copper, and wireless, and in a number of different protocols some of which may be non-transient. The interface 314 can include a plurality of antennas that provides communication channels to the transmitter module 306 and the receiver module 308 for communication with other communication devices, such as UE 134.

In some embodiments, the transmitter module 306 can include individual transmitter circuits that supply signals to antennas in the interface 314 for transmission. For simplicity, these individual transmitter circuits are not shown.

In some embodiments, the receiver module 308 can receive signals from the interface 314 and supply the signals to the controller module 310. It is understood that the receiver module 308 may include a plurality of individual receiver circuits. For simplicity, these individual receiver circuits are not shown.

The controller module 310 can supply data (in the form of transmit signals) to the transmitter module 306 and process signals received by the receiver module 308. In addition, the controller module 310 can perform other transmit and receive control functionality. In some embodiments, the controller module 310 can apply downlink beamforming weight vectors to the multiple downlink transmission streams (e.g., symbol streams) to produce transmit signals. The controller module 310 can supply the transmit signals to the transmitter 306 and the transmitter module 306 can modulate the respective transmit signals for transmission via the interface 314.

In some embodiments, the controller module 310 can include a MCS module 312. The MCS module 312 can coordinate the link adaptation operation for the base station 300. In some embodiments, the MCS module 312 can cause the controller module 310 to perform the fine-grained link adaptation mechanism described herein.

In some embodiments, one or more of the modules 306, 308, 310, 312 can be implemented in software using the memory 304. The software can run on a processor 302 capable of executing computer instructions or computer code. The processor 302 might also be implemented in hardware using an application specific integrated circuit (ASIC), programmable logic array (PLA), digital signal processor (DSP), field programmable gate array (FPGA), or any other integrated circuit. The processor 302 suitable for the execution of a computer program include, by way of example, both general and special purpose microprocessors, digital signal processors, and any one or more processors of any kind of digital computer. Generally, the processor 302 receives instructions and data from a read-only memory or a random access memory or both.

In some embodiments, one or more of the modules (e.g., modules 306, 308, 310, 312) can be implemented in hardware using an ASIC (application-specific integrated circuit), PLA (programmable logic array), DSP (digital signal processor), FPGA (field programmable gate array), or other integrated circuit. In some embodiments, two or more modules 306, 308, 310, 312 can be implemented on the same integrated circuit, such as ASIC, PLA, DSP, or FPGA, thereby forming a system on chip. Subroutines can refer to portions of the computer program and/or the processor/special circuitry that implement one or more functions.

The modules 306, 308, 310, 312 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The base station 300 can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

Parts of the functions of the transmitter module 306, receiver module 308, and controller module 310 may be implemented in a modem and other parts of the transmitter module 306 and receiver module 308 may be implemented in radio transmitter and radio transceiver circuits. It should be understood that there are analog-to-digital converters (ADCs) and digital-to-analog converters (DACs) in the various signal paths to convert between analog and digital signals.

While the controller module 310 is depicted as a part of the base station 300, the controller module 310 can be a separate entity or a part of a separate entity from the base station 300. For example, the controller module 310 can reside in a serving gateway in communication with the base station 300 to provide fine-grained link adaptation. As another example, the controller module 310 can reside in an anchor gateway in communication with the base station 300 to provide fine-grained link adaptation.

In some embodiments, the controller module 310 can implement Inter-cell Interference Coordination (ICIC). ICIC is a method used in a LTE network to manage interference of signals generated by adjacent cells. ICIC coordinates the transmission of signals in adjacent cells so that the adjacent cells do not use the same frequency-time resources. ICIC coordinates the signal transmissions between cells by providing a communication mechanism between base stations over an X2 interface.

For downlink ICIC, the controller module 310 can reduce signal interference by controlling the downlink transmission power of RBs. For example, when a first base station is using a particular RB with high transmission power, the controller module 310 in the first base station can notify a second base station that the particular RB is used with high transmission power. In response to receiving the notification, the second base station can schedule its signal transmission so that the second base station does not use high transmission power with the particular RB. In some embodiments, the controller module 310 can share such resource block scheduling information using a Relative Narrowband Transmit Power (RNTP) message.

However, because the ICIC mechanism may not entirely remove signal interference between adjacent cells, it is desirable to perform link adaptation that accounts for the signal interference between adjacent cells. In some sense, the CQI based link adaptation mechanism does take into account the signal interference between adjacent cells. The CQI provided by UE 134 can capture average interference within a sub-band of frequencies (in case of a sub-band CQI) or the cell's entire bandwidth (in case of a wide-band CQI). Therefore, by selecting the MCS based on the CQI, the base station 300 can take into account the interference between cells.

However, the CQI-based link adaptation mechanism may not accurately account for the interference between cells. Oftentimes, base stations in different cells can control the downlink transmit power at a RB granularity. Therefore, the interference level can be different from one RB to another. However, the CQI cannot provide the fine-grained interference information at the RB granularity because the CQI merely provides an interference level averaged over a broader set of frequency bands. Therefore, the CQI-based link adaptation mechanism may not accurately account for the interference between cells.

In some embodiments, the MCS module 312 in the controller module 310 can provide a fine-grained link adaptation mechanism that is capable of adapting to the interference level at a RB granularity. To this end, the MCS module 312 can compute the effective SINR for particular UE and for individual RBs. The effective SINR for individual RBs can be computed by explicitly accounting for the difference in SINR for individual RBs.

Figure 4:
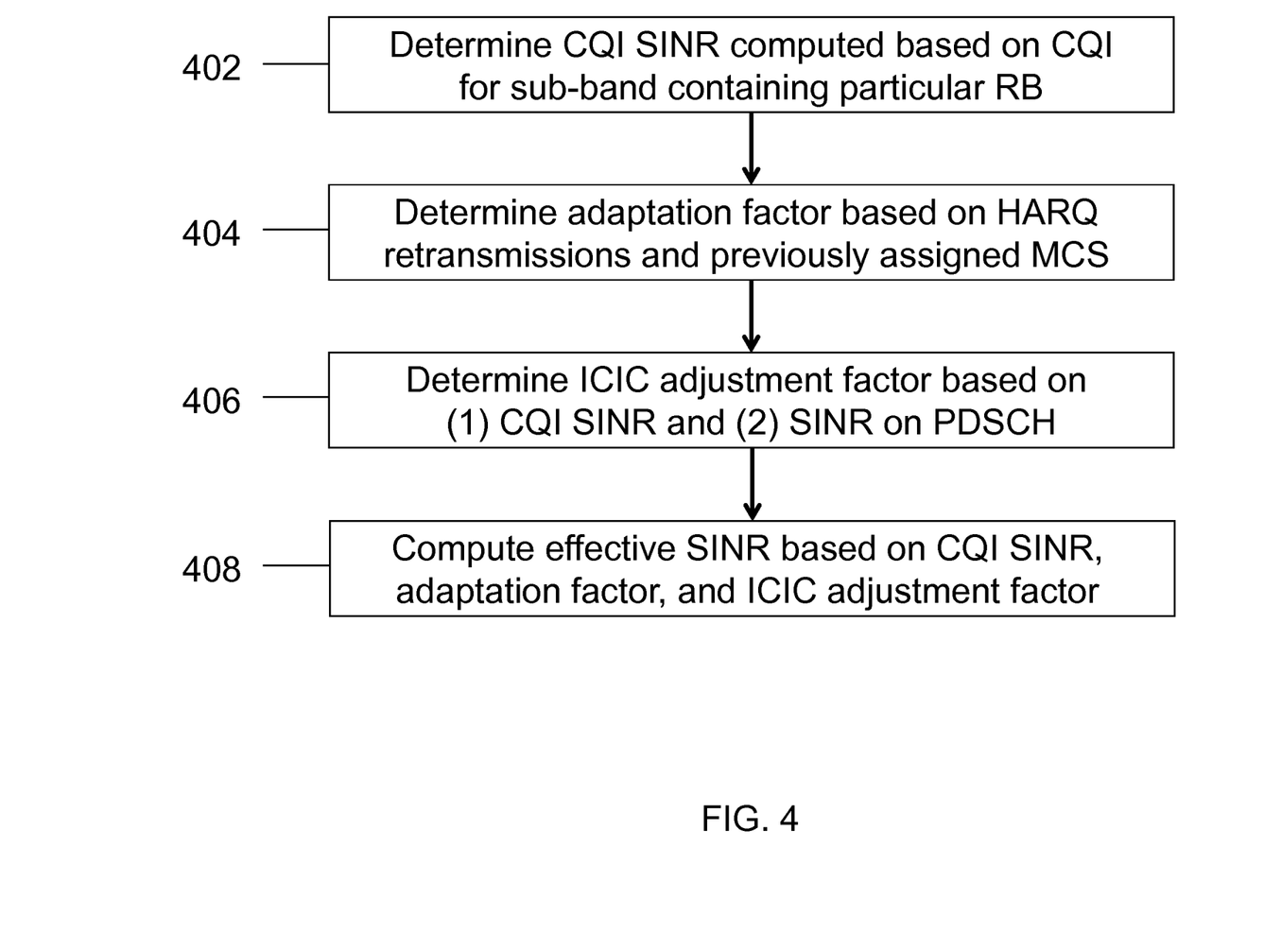
FIG. 4 illustrates a process for determining an effective SINR for a particular resource block in accordance with some embodiments.

FIG. 4 illustrates a process for determining an effective SINR for a particular RB in accordance with some embodiments. In step 402, the MCS module 312 is configured to determine a CQI SINR $\gamma_{CQI}$ (i, j, k) based on the CQI reported by UE 134 for a sub-band that includes the particular RB. The index i refers to UE; the index j refers to a cell, and the index k refers to the particular RB.

In some embodiments, the CQI SINR $\gamma_{CQI}$ can be computed as follows:

$$\gamma_{CQI}(i, j, k) = \frac{P_{CRS}(j)E[G(i, j, k)]}{E_{INT}}$$

where $P_{CRS}$ (j) is the Cell Specific Reference Signal (CRS) Energy Per Resource Element (EPRE) for the cell j; E[ ] is an expectation operator; $E_{INT}$ is the average interference; and G(i, j, k) is the channel gain from the cell j to UE i on RB k. In some embodiments, the MCS module 312 can compute the CQI SINR $\gamma_{CQI}$ (i, j, k) using a standard technique employed in the industry. For example, the MCS module 312 can analyze the PDSCH transmission scheme and compute bit error curves for the MCS reported in CQI as function of SINR. Then the SINR can be picked as corresponding to, for example, 99% success for the MCS reported.

In step 404, the MCS module 312 is configured to determine the adaptation factor $\Delta_{adapt}$ (i, j, $t_{harq}$). The adaptation factor can be a SINR margin computed based on the predetermined limit on the number of packet retransmissions and/or the MCS previously assigned to the UE i. The MCS module 312 can determine the adaptation factor $\Delta_{adapt}$ (i, j, $t_{harq}$) based on a feedback loop that adjusts the adaptation factor until the selected MCS is successful within the predetermined number of HARQ retransmissions with a predetermined probability. The adaptation factor $\Delta_{adapt}$ (i, j, $t_{harq}$) can capture the unpredictability of communication channels (e.g., UE mobility) and the UE specific implementation.

In step 406, the MCS module 312 can determine the interference adjustment factor $\Delta_{ICIC}$(i, j, k). The interference adjustment factor $\Delta_{ICIC}$(i, j, k) can be computed as follows:

$$\Delta_{ICIC}(i,j,k) = \gamma_{CQI}(i,j,k) - \gamma_{PDSCH}(i,j,k)$$

where $\gamma_{CQI}$ is the SINR computed from the CQI, as discussed above, and $\gamma_{PDSCH}$ is the SINR on the PDSCH.

In some embodiments, if the sub-band CQI is used, the expectation operation E[ ] is performed over the sub-band of frequencies associated with the CQI; if the wide-band CQI is used, the expectation operation E[ ] is performed over the entire cell bandwidth. Similarly, in some embodiments, if the sub-band CQI is used, the average interference $E_{INT}$ is an average interference over the sub-band of frequencies associated with the CQI; if the wide-band CQI is used, the average interference $E_{INT}$ is an average interference over the entire cell bandwidth.

In some embodiments, the MCS module 312 can determine the channel gain G(i, j, k) based on the Reference Signal Received Power (RSRP) reported by UE i. For example, the MCS module 312 can receive the RSRP report from UE i from the cell j. The MCS module 312 can use the RSRP report to determine $P_{CRS}$(j)G(i, j, k) assuming flat fading. For example, the MCS module 312 can determine $P_{CRS}$(j)G(i, j, k) based on the RSRP report in accordance with 3GPP Technical Specification 36.214, entitled "Evolved Universal Terrestrial Radio Access (E-UTRA); Physical layer; Measurements," which is herein incorporated by reference in its entirety.

Subsequently, the MCS module 312 can determine the CRS EPRE $P_{CRS}$(j) for the cell j by decoding the System Information Block Type 2 (SIB2) message for the cell j. Therefore, the MCS module 312 can factor out the CRS EPRE $P_{CRS}$(j) from $P_{CRS}$(j)G(i, j, k) to determine the channel gain G(i, j, k) for the cell j. In some cases, the channel gain G(i, j, k) may need to be scaled appropriately if the base station 300 uses a multiple-input-multiple-output (MIMO) transceiver.

In some embodiments, the MCS module 312 can estimate the channel gain G(i, j, k) based on a Reference Signal Received Quality (RSRQ) measurement combined with $P_{CRS}$(j) (known from the SIB2 message.) The RSRQ is defined as follows:

$$RSRQ = \frac{N \times RSRP}{RSSI}$$

where N is number of RBs over which RSRQ is measured and RSSI refers to received signal strength indication. Therefore, the MCS module 312 can use the above relationship to derive RSRP from RSRQ, and use the derived RSRP to determine $P_{CRS}(j)G(i, j, k)$ in accordance with 3GPP Technical Specification 36.214. Thus, based on $P_{CRS}$ (j) known from the SIB2 message, the MCS module 312 can estimate the channel gain G(i, j, k).

In some embodiments, the PDSCH SINR $\gamma_{PDSCH}$ can be determined as follows:

$$\gamma_{PDSCH} = \frac{P_{PDSCH}(j, k)G(i, j, k)}{\sum_{j' \neq j} P_{PDSCH}(j', k)G(i, j', k)}$$

where $P_{PDSCH}$ (j, k) is the PDSCH EPRE for the cell j for the particular RB k. It is notable that the EPRE value does not vary with system bandwidth or number of RBs and that the CRS EPRE $P_{CRS}(j)$ is constant across frequencies, whereas the PDSCH EPRE $P_{PDSCH}$ (j, k) is a function of the RB index k.

To determine the PDSCH SINR $\gamma_{PDSCH}$, the MCS module 312 can determine $P_{PDSCH}$ (j, k)G(i, j, k) based on the Reference Signal Received Power (RSRP) reported by UE i. For example, the MCS module 312 can receive the RSRP report from UE i from the cell j. The MCS module 312 can use the RSRP report to determine $P_{CRS}(j)G(i, j, k)$ assuming flat fading.

Given this relationship, the MCS module 312 can transform the formula for the PDSCH SINR $\gamma_{PDSCH}$ as follows:

$$\gamma_{PDSCH} = \frac{\left(\frac{P_{PDSCH}(j, k)}{P_{CRS}(j)}\right) P_{CRS}(j)G(i, j, k)}{\sum_{j' \neq j}\left(\frac{P_{PDSCH}(j', k)}{P_{CRS}(j')}\right) P_{CRS}(j')G(i, j', k)}$$

Since $P_{CRS}(j)G(i, j, k)$ and $P_{CRS}(j')G(i, j', k)$ can be determined using the RSRP report from the cells j and j', respectively, the MCS module 312 can compute the PDSCH SINR $\gamma_{PDSCH}$ if the MCS module 312 can compute the EPRE ratio $$\left(\frac{P_{PDSCH}(j, k)}{P_{CRS}(j)}\right)$$

for each cell j and for each RB k.

When the MCS module 312 is in a base station residing in the cell j, then the MCS module 312 can access to the CRS EPRE $P_{CRS}(j)$ and the PDSCH EPRE $P_{PDSCH}$ (j, k) for the cell j. Therefore, the MCS module 312 can easily compute the EPRE ratio $$\left(\frac{P_{PDSCH}(j, k)}{P_{CRS}(j)}\right)$$

for its cell j.

In order to compute the EPRE ratio $$\left(\frac{P_{PDSCH}(j, k)}{P_{CRS}(j)}\right)$$

for neighboring cells, the MCS module 312 can use one of several mechanisms. In some embodiments, the MCS module 312 can determine the CRS EPRE $P_{CRS}(j)$ for neighboring cells by decoding SIB2 messages for the neighboring cells. The MCS module 312 can access the SIB2 messages for the neighboring cells using the network listen mode. Also, the MCS module 312 can determine the PDSCH EPRE $P_{PDSCH}$ (j, k) for neighboring cells by receiving the total transmission power of neighboring cells from a centralized server in a centralized self-organizing network, and/or an operations, administration and management server (OAM). Subsequently, the MCS module 312 can computationally determine the EPRE ratio $$\left(\frac{P_{PDSCH}(j, k)}{P_{CRS}(j)}\right)$$

for neighboring cells based on the CRS EPRE $P_{CRS}(j)$ and the PDSCH EPRE $P_{PDSCH}$ (j, k) for neighboring cells.

In some embodiments, the MCS module 312 can determine the EPRE ratio $$\left(\frac{P_{PDSCH}(j, k)}{P_{CRS}(j)}\right)$$

for neighboring cells based on an RNTP message. The RNTP message can indicate, for each cell and for each RB, whether the PDSCH EPRE is greater than a predetermined threshold. If the PDSCH EPRE for a particular RB is greater than the predetermined threshold, the RB can be labeled as "1"; if the PDSCH EPRE for a particular RB is not greater than the predetermined threshold, the RB can be labeled as "0."

In some cases, to compute the EPRE ratio, the MCS module 312 can be configured to receive the power transmission levels (e.g., power spectral density level) for RBs marked 0 and 1 in the RNTP message. For example, the MCS module 312 can be configured to receive the power transmission levels $P_{PDSCH}(j, k)$ for RBs marked 0 and 1 from a centralized server and/or an OAM. In some embodiments, the MCS module 312 can be configured to translate the power transmission levels $P_{PDSCH}$ (j, k) into the EPRE ratio assuming that the CRS EPRE is equal to the total power distributed equally across all CREs. In other embodiments, the MCS module 312 can be configured to translate the power transmission levels $P_{PDSCH}$ (j, k) into the EPRE ratio based on an explicit knowledge of the CRS EPRE $P_{CRS}(j)$.

In step 408, the MCS module 312 can determine the effective SINR for each RB based on the CQI SINR $\gamma_{CQI}$ (i, j, k), the adaptation factor $\Delta_{adapt}$ (i, j, $t_{harq}$), and the interference adjustment factor $\Delta_{ICIC}$ (i, j, k) as follows:

$$\gamma_{EFF}(i,j,k) = \gamma_{CQI}(i,j,k) + \Delta_{adapt}(i,j,t_{harq}) + \Delta_{ICIC}(i,j,k)$$

Subsequently, the MCS module 312 can use the effective SINR to determine the MCS for link adaptation.

User Equipment

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the popularity tracking module can be placed in a gateway.

The invention claimed is:

1. A network device comprising:
   a communication interface;
   a memory; and
   a controller comprising a modulation and coding scheme (MCS) module;
   wherein the network device is configured to:
   determine a signal-to-interference-plus-noise ratio (SINR) based on channel state information received from a user equipment;
   determine an adaptation factor based, at least in part, on at least one of a predetermined limit of a number of packet retransmissions to the user equipment or an MCS previously assigned to the user equipment;
   receive resource block scheduling information associated with one or more neighboring cells from transmitters in the neighboring cells as a part of a Relative Narrowband Transmit Power (RNTP) message;
   determine an interference adjustment factor that accounts for a signal interference level at a resource block granularity and is based, at least in part, on transmission information associated with the one or more neighboring cells, the transmission information comprising the resource block scheduling information associated with the one or more neighboring cells;
   determine an MCS for the user equipment at the resource block granularity based, at least in part, on the SINR, the adaptation factor, and the interference adjustment factor; and
   communicate with the user equipment using the determined MCS.

2. The network device of claim 1, wherein the interference adjustment factor is based, at least in part, on a difference between a SINR derived from channel state information corresponding to a particular resource block and a SINR of a downlink data channel for the particular resource block.

3. The network device of claim 2, wherein the network device is further configured to determine the SINR of the downlink data channel based, at least in part, on the resource block scheduling information.

4. The network device of claim 2, wherein the network device is further configured to determine the SINR of the downlink data channel based, at least in part, on downlink transmission power information associated with neighboring cells received from a centralized server in a centralized self-organizing network.

5. The network device of claim 2, wherein the network device is further configured to determine the SINR of the downlink data channel based, at least in part, on downlink transmission power information associated with neighboring cells received from an operations, administration and management server (OAM).

6. The network device of claim 2, wherein the network device is further configured to determine the SINR of the downlink data channel based, at least in part, on a System Information Block Type 2 (SIB2) message associated with at least one neighboring cell.

7. The network device of claim 2, wherein the SINR derived from channel state information corresponding to a particular resource block comprises an SINR derived from channel state information for a sub-band of frequencies including the particular resource block.

8. The network device of claim 1, wherein the network device comprises at least one of a base station, a serving gateway, or an anchor gateway.

9. The network device of claim 1, wherein determining the adaptation factor includes adjusting the adaptation factor until the determined MCS is successful within the predetermined limit of packet retransmissions with a predetermined probability.

10. The network device of claim 1, wherein the resource block scheduling information associated with the one or more neighboring cells relates to transmission power for a reference signal for the one or more neighboring cells.

11. A non-transitory computer readable medium comprising computer code that when executed by a network device is operable to cause the network device to:
determine a signal-to-interference-plus-noise ratio (SINR) based on channel state information received from a user equipment;
determine an adaptation factor based, at least in part, on at least one of a predetermined limit of a number of packet retransmissions to the user equipment or a modulation and coding scheme (MCS) previously assigned to the user equipment;
receive resource block scheduling information associated with one or more neighboring cells from transmitters in the neighboring cells as a part of a Relative Narrowband Transmit Power (RNTP) message;
determine an interference adjustment factor that accounts for a signal interference level at a resource block granularity and is based, at least in part, on transmission information associated with the one or more neighboring cells, the transmission information comprising the resource block scheduling information associated with the one or more neighboring cells;
determine an MCS for the user equipment at the resource block granularity based, at least in part, on the SINR, the adaptation factor, and the interference adjustment factor; and
provide the determined MCS for use in communication with the user equipment.

12. The medium of claim 11, wherein the interference adjustment factor is based, at least in part, on a difference between a SINR derived from channel state information corresponding to a particular resource block and a SINR of a downlink data channel for the particular resource block.

13. The medium of claim 12, wherein the computer code when executed is further operable to cause the network device to determine the SINR of the downlink data channel based, at least in part, on the resource block scheduling information associated with neighboring cells.

14. The medium of claim 12, wherein the computer code when executed is further operable to cause the network device to determine the SINR of the downlink data channel based on downlink transmission power information associated with neighboring cells.

15. The medium of claim 11, wherein the computer code when executed is further operable to cause the network device to:
determine an effective SINR for a particular resource block for the user equipment based, at least in part, on the SINR based on channel state information received from the user equipment, the adaptation factor, and the interference adjustment factor; and
determine the MCS for the user equipment for the particular resource block based on the effective SINR.

16. A network device comprising:
a communication interface;
a memory; and
a controller comprising a modulation and coding scheme (MCS) module;
wherein the network device is configured to:
receive resource block scheduling information associated with one or more neighboring cells from transmitters in the neighboring cells as a part of a Relative Narrowband Transmit Power (RNTP) message;
determine an interference adjustment factor that accounts for a signal interference level for a particular resource block, the interference adjustment factor based, at least in part, on a difference between a signal-to-interference-plus-noise ratio (SINR) derived from channel state information corresponding to the particular resource block and a SINR of a downlink data channel for the particular resource block, the SINR of the downlink data channel based, at least in part, on transmission information associated with the one or more neighboring cells, the transmission information comprising the resource block scheduling information associated with the one or more neighboring cells;
determine a modulation and coding scheme (MCS) for a user equipment for the particular resource block based, at least in part, on the interference adjustment factor; and
communicate with the user equipment using the determined MCS.

17. The network device of claim 16, wherein the network device is further configured to determine the SINR of the downlink data channel based on the resource block scheduling information associated with neighboring cells.

18. The network device of claim 16, wherein the network device is further configured to determine the SINR of the downlink data channel based on downlink transmission power information associated with neighboring cells.

19. The network device of claim 16, wherein the network device is further configured to:
derive an effective SINR for the particular resource block for the user equipment based on a SINR based on channel state information received from the user equipment, an adaptation factor, and the interference adjustment factor; and
determine the MCS for the user equipment for the particular resource block based on the effective SINR.

20. The network device of claim 19, wherein the adaptation factor is based on a predetermined limit of a number of packet retransmissions to the user equipment.

* * * * *